US007406601B2

(12) United States Patent
Hamid

(10) Patent No.: US 7,406,601 B2
(45) Date of Patent: Jul. 29, 2008

(54) SECURE MESSAGING FOR SECURITY TOKEN

(75) Inventor: Laurence Hamid, Ottawa (CA)

(73) Assignee: Activecard Ireland, Ltd., Dublin (IE)

( * ) Notice: Subject to any disclaimer, the term of this patent is extended or adjusted under 35 U.S.C. 154(b) by 886 days.

(21) Appl. No.: 10/443,977

(22) Filed: May 23, 2003

(65) Prior Publication Data

US 2004/0250084 A1 Dec. 9, 2004

(51) Int. Cl.
  *H04L 9/20* (2006.01)
  *G06F 21/00* (2006.01)
(52) U.S. Cl. .......................... 713/186; 726/20
(58) Field of Classification Search .................. None
  See application file for complete search history.

(56) References Cited

U.S. PATENT DOCUMENTS

| 5,987,155 | A | * | 11/1999 | Dunn et al. | 382/116 |
| 6,011,858 | A | * | 1/2000 | Stock et al. | 382/115 |
| 6,092,202 | A | | 7/2000 | Veil et al. | |
| 6,219,439 | B1 | | 4/2001 | Burger | |
| 6,591,249 | B2 | * | 7/2003 | Zoka | 705/18 |
| 6,629,591 | B1 | * | 10/2003 | Griswold et al. | 194/205 |
| 6,735,695 | B1 | * | 5/2004 | Gopalakrishnan et al. | 713/186 |
| 7,114,646 | B2 | * | 10/2006 | Hillhouse | 235/375 |
| 2002/0030581 | A1 | | 3/2002 | Janiak et al. | |
| 2002/0174346 | A1 | | 11/2002 | Ting | 713/186 |

FOREIGN PATENT DOCUMENTS

FR 2 780 797 A 1/2000

OTHER PUBLICATIONS

Ratha et al., Secure Data Hiding in Wavelet Compressed Fingerprint Images, 2000, ACM Multimedia Workshop, pp. 127-130.*
Satonaka, Biometric Watermark Authentication with Multiple Verification Rule, IEEE, 2002, pp. 597-606.*
Mimura et al., "Fingerprint Verification System on a Smart Card", 2002, IEEE, pp. 182-183.*
Seto, "Development of Personal Authentication Systems using Fingerprint with Smart Cards and Digital Signature Technologies", Dec. 2002, Seventh International Conference on Control, Automation, Robotics and Vision, Dec. 2002, Singapore, pp. 996-1001.*
Abadi, M. et al., "On Hiding Information from an Oracle," *Proceedings of the Annual Conferences on Structure in Complexity Theory*, Ithaca, Jun. 16-19, 1987, *Conf. 2*, 1-29.
Ishida, S. et al., "Development of Personal Authentication Techniques Using Fingerprint Matching Embedded in Smart Cards," *IEICE Transactions on Information and Systems*, Tokyo, Japan, Jul. 2001, 812-818.
Ozaki, S. et al., "Speeding up Fingerprint Verification with Insecure Auxiliary Devices," *International Solvent Extraction Conference*, Mar. 16, 1990, 17-24.
Matsumoto, T. et al., "Speeding up Secret Computations with Insecure Auxiliary Devices," *Advances in Cryptology*, Santa Barbara, Aug. 21-25, 1988, 497-506.

* cited by examiner

*Primary Examiner*—Kambiz Zand
*Assistant Examiner*—William S Powers
(74) *Attorney, Agent, or Firm*—Perkins Coie LLP

(57) ABSTRACT

A method, system and computer program product for ensuring a biometric template is associated with a live entity comprising an intelligent biometric scanner in processing communications with a computer system and a security token. The intelligent biometric scanner applies a data transformation to an inputted entity biometric sample and a biometric challenge supplied by a security token. The transformed biometric sample is processed by a computer system using the transformed biometric challenge resulting in an transformed entity biometric template which will not match an enrollment template stored inside the security token until the transformation is reversed by the intelligent biometric scanner. Embodiment of the invention are also disclosed which does not require the use of a challenge.

55 Claims, 14 Drawing Sheets

SECURE MESSAGING FOR SECURITY TOKEN

FIELD OF INVENTION

The present invention relates generally to a data processing system, method and computer program product and more specifically a security mechanism for use with biometric authentication systems incorporating an intelligent biometric scanner and a security token.

BACKGROUND

Performing a biometric comparison rather than using a personal identification number (PIN) with a smart card is desirable since it provides a stronger binding of the card to a user. Due to computation and memory constraints of smart cards in the relevant art, only a small portion of the biometric processing, generally the final match can reasonably be performed on the card. Moreover, an integrated device which incorporates the features of a smart card reader and a biometric sensor capable of performing all of the biometric processing would be prohibitively expensive for most purposes, since it would require the computational capability and memory capacity of at least a modern desktop computer system.

This requires that a local computer system in communication with the integrated device be involved in certain aspects of biometric processing such as image enhancement, biometric feature extraction, template creation and template alignment. For identification or authentication purposes, local computer systems are not trusted due to their generally being situated in locales which facilitates unrestricted physical and/or logical access to the computer.

The generally unrestricted access to the local computer system could allow an unauthorized entity to provide information other than that derived from a "live" source in order to deceive the integrated device and associated smart card into falsely identifying and/or authenticating the unauthorized entity. The most likely example of this is the inclusion of malicious software on the local computer system which supplies biometric templates either obtained from a hacked database, or a replay of a previously generated biometric template to the integrated device without detection of the fraudulent transaction. Since the integrated device lacks the processing capabilities to internally generate the biometric template, it cannot determine whether the biometric template supplied by the local computer system is derived from a "live" source or is a fraudulent presentation.

Efforts to improve security of inputs are known in the relevant art. For example, U.S. Pat. No. 6,092,202 to Veil, et al. discloses a secure method and system which provides a trusted security processor between a smart card and a computer system. This arrangement may be effective but requires a reasonably powerful microprocessor and difficult to maintain embedded algorithms to extract biometric information for use with the smart card.

In another example, U.S. Pat. No. 6,219,439 to Burger discloses a portable standalone biometric scanner having a smart card interface. The invention provides a secure mechanism to prevent online capture of biometric data but also requires a reasonably powerful microprocessor and difficult to maintain embedded algorithms to extract biometric information for use with the smart card.

In a final example, US patent application 2002/003581 to Janiak, et al. discloses another integrated biometric scanner and smart card reader device. The device provides much of the processing for matching by the smart card, but as before, requires a reasonably powerful microprocessor and difficult to maintain embedded algorithms to extract biometric information for use with the smart card.

SUMMARY

This invention addresses the limitations described above which prevents an unauthorized entity from using an electronically intercepted biometric template or replayed biometric sample from gaining access to a computer system by presenting the latter or former to a security token having operatively stored therein an authorized entity's enrollment biometric template. Furthermore, the invention does not require a powerful microprocessor in order to provide the security features cited above. The invention is comprised of a method portion, a system portion and a computer program product portion.

The term "security token" as defined herein refers to both software and hardware based security devices such as virtual security tokens, security tokens, smart cards, cryptography modules, integrated circuit card, portable data carriers (PDC), personal security devices (PSD), subscriber identification modules (SIM), wireless identification modules (WIM), USB token dongles, identification tokens, secure application modules (SAM), hardware security modules (HSM), secure multi-media token (SMMC) and like devices.

The method portion of the invention is comprised of a process for ensuring that a generated biometric template is associated with a live entity by generally performing the steps of:

a. generating a transformed biometric sample by applying a data transformation to at least a portion of a biometric sample received from the live entity, b. generating a transformed entity biometric template by extracting one or more biometric features included in the transformed biometric sample, c. reversing the data transformation incorporated into the transformed entity biometric template, and d. generating an entity biometric template before attempting to compare the entity biometric template to an enrollment biometric template.

Step b. is performed by a computer system while the remaining steps a., c. and d. may be performed by either an intelligent biometric scanner or a security token. In an alternate embodiment of the invention, a transformed biometric challenge is generated along with the transformed biometric sample. The transformed biometric challenge is used to specify at least a portion of the one or more biometric features to be extracted from the transformed biometric sample. The biometric challenge originates from a security token and is associated with an enrollment template operatively stored in the memory of the security token.

In another embodiment of the invention, the entity biometric template is generated sequentially by sending data parts including portions of at least the transformed biometric sample to the computer system for processing. The computer system sequentially processes the received portions of the transformed biometric sample and sequentially returns in data parts, portions of the transformed entity biometric template.

In one embodiment of the invention, the intelligent biometric scanner sequentially receives the portions of the transformed entity biometric template and assembles the transformed entity biometric template which is then transformed into an entity biometric template by reversing the data transformation incorporated into the transformed entity biometric template. In another embodiment of the invention, this process may be performed directly by the security token. In yet another embodiment of the invention, the transformed biometric challenge and the transformed biometric sample are sequentially sent and processed by the computer system and returned to either the intelligent biometric scanner or security token for assembly of the entity biometric template.

The data transformation is comprised of at least a pixel inversion or a coordinate system deviation which in one embodiment of the invention is randomly varied after each session. In another embodiment of the invention, the data transformation may be performed after each of the aforementioned data parts are sent to the computer system.

Once the entity biometric template has been generated, the following steps are performed;
- a. sending the entity biometric template to the security token,
- b. comparing the entity biometric template to the enrollment biometric template,
- c. sending an affirmative signal to the computer system if the entity biometric template matches the enrollment biometric template, and
- d. allowing the live entity access to at least one secure function following receipt of the affirmative signal.

The system portion of the invention is comprised of an intelligent biometric scanner in processing communications with a computer system and a security token. The intelligent biometric scanner includes a scanner processor, a scanner memory coupled to the scanner processor, a biometric sensor coupled to the scanner processor, and at least one scanner biometric processing application operatively installed in the scanner memory. The at least one scanner biometric processing application includes means for;
- a. generating a transformed biometric sample by applying a data transformation to a biometric sample inputted into the biometric sensor,
- b. reversing the data transformation incorporated into a transformed entity biometric template, and
- c. generating an entity biometric template.

The security token includes a token processor, token memory coupled to the token processor, the entity biometric template operatively installed in the token memory, and at least one token biometric processing application operatively installed in the token memory. The at least one token biometric processing application includes means for;
- a. comparing the entity biometric template to the enrollment biometric template, and
- b. sending an affirmative signal to the computer system if the entity biometric template matches the enrollment biometric template.

The computer system includes a processor, a memory coupled to the processor, and at least one biometric processing application operatively installed in the memory. The at least one biometric processing application includes means for generating the transformed entity biometric template by extracting one or more biometric features from the transformed biometric sample.

In an alternate embodiment of the system portion of the invention, which may be accomplished with or without a biometric challenge, the at least one scanner biometric processing application includes means for;
- a. dividing the biometric sample into a plurality of sample parts,
- b. applying a data transformation to each member of the plurality of sample parts,
- c. sequentially sending the plurality of sample parts to the computer system,
- d. sequentially receiving the plurality of entity biometric template parts from the computer system, and
- e. sequentially reversing the data transformation applied to each of the sample parts, and
- f. sequentially assembling the transformed entity biometric template.

In this alternate embodiment of the system portion of the invention, the at least one biometric processing application includes means for;
- a. sequentially receiving the plurality of transformed sample parts,
- b. sequentially generating a plurality of transformed entity biometric template parts, and
- c. sequentially returning the plurality of transformed entity biometric template parts to the intelligent biometric scanner.

In the computer program product portion of the invention, the programs and associated data described by the method and system descriptions provided above may be recorded on transportable digital recording media such as a CD ROM, floppy disk, data tape, or DVD for installing on a the computer system, intelligent biometric scanner and/or security token.

BRIEF DESCRIPTION OF DRAWINGS

The features and advantages of the invention will become apparent from the following detailed description when considered in conjunction with the accompanying drawings. Where possible, the same reference numerals and characters are used to denote like features, elements, components or portions of the invention. It is intended that changes and modifications can be made to the described embodiment without departing from the true scope and spirit of the subject invention as defined in the claims.

DETAILED DESCRIPTION

A method, system and computer program product for ensuring a biometric template is associated with a live entity is comprised of an intelligent biometric scanner in processing communications with a computer system and a security token. The intelligent biometric scanner applies a data transformation to an inputted entity biometric sample. The transformed biometric sample is processed by a computer system having a biometric processing application resulting in a transformed entity biometric template which will not match an enrollment template stored inside the security token until the transformation is reversed by the intelligent biometric scanner. The applications are envisioned to be programmed in a high level language using such as Java™, C++, C or Visual Basic™.

Figure 1:
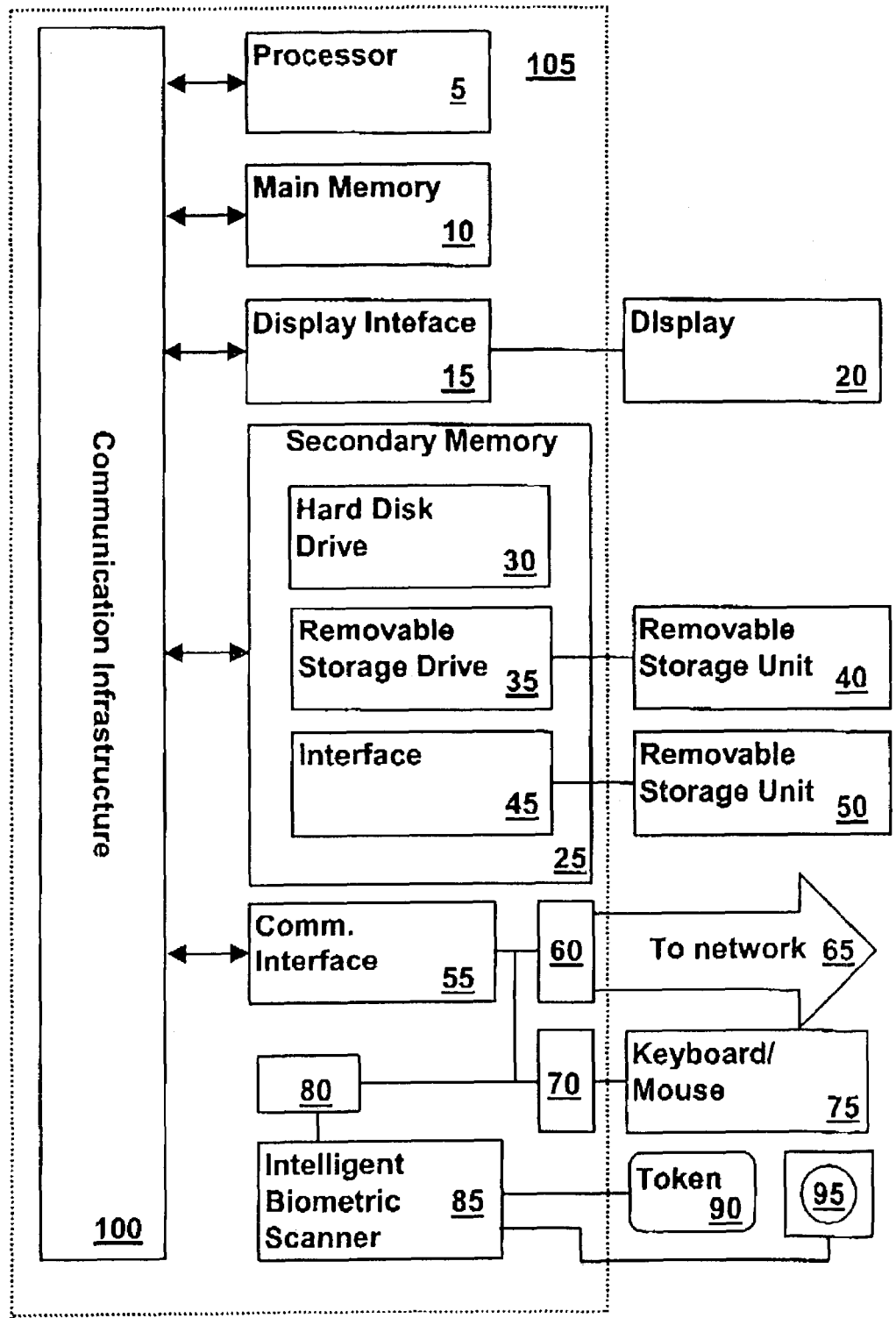
FIG. 1—is a generalized block diagram of a host computer system and associated peripherals used in the invention.

Referring to FIG. 1, a typical computer system 105 is shown which includes a processor 5, a main memory 10, a display 20 electrically coupled to a display interface, a secondary memory subsystem 25 electrically coupled to a hard disk drive 30, a removable storage drive 35 electrically coupled to a removable storage unit 40 and an auxiliary removable storage interface 45 electrically coupled to an auxiliary removable storage unit 50.

A communications interface 55 subsystem is coupled to a network interface 60 and a network 65, a user input interface 70 including a mouse and a keyboard 75, a biometric scanner interface 80 including an intelligent biometric scanner 85, having electromagnetically coupled thereto a security token 90, and a biometric sensor 95.

The processor 5, main memory 10, display interface 15 secondary memory subsystem 25 and communications interface system 55 are electrically coupled to a communications infrastructure 100. The computer system 105 includes an operating system, at least one biometric processing application, other applications software, cryptography software capable of performing symmetric and asymmetric cryptographic functions, secure messaging software and device interface software. The at least one biometric processing application includes the ability to receive a biometric sample and a biometric challenge, extract biometric data related to specific biometric features of interest included in the biometric sample and generate an entity biometric template which incorporates the extracted biometric features.

For fingerprints, the biometric features of interest include ridge flow angles, grid quality, minutia direction, swirl, core and delta locations, image area, minutia type, minutia location, triangles derived from minutia locations and ridge spacing. For facial recognition, the relevant biometric features of interest include, eyebrow position, eyebrow spacing, eyebrow angles, eyebrow lengths, eyebrow direction of run, wrinkle angles, lengths and run directions, eye positions and spacing, nose position, angle and nostril characteristics, mouth position and offset angles, and triangles derived from any of the prominent physical features described above. It will be appreciated by those skilled in the art that other biometric features of interest may be used as well.

The communications interface 55 includes a wireless, optical and/or electrical connection means compatible with the network interface 60, user input interface 70 and biometric scanner interface 80.

The intelligent biometric scanner 85 includes a processor electrically coupled to volatile and non-volatile memory, at least one biometric processing application either embedded in the non-volatile memory or downloadable from the computer system 105 via the communications interfaces 55, 60, 80. The processor included in the intelligent biometric scanner 85 is intended to be relatively simple, having greater processing capabilities than a processor included in the security token 90 but generally less processing capability than the processor 5 included in the computer system 105.

The at least one biometric processing application includes the ability to receive a biometric challenge from the security token 90, receive a biometric sample from the biometric sensor 95, perform a transformation on the received biometric sample and biometric challenge, and send the transformed biometric sample and biometric challenge to the computer system 105 for processing. The transformation performed on the biometric sample and biometric challenge is comprised of at least a pixel inversion, translation, rotation, mirror image or a coordinate deviation. The at least one biometric processing application further includes the ability to receive a transformed entity biometric template from the computer system, reverse the transformation and send the entity biometric template to the security token for comparison with an enrollment biometric template.

The security token 90 includes a processor, volatile and non-volatile memory electrically coupled to the processor, a runtime operating environment, cryptography extensions applied to the operating system and capable of performing symmetric and asymmetric cryptographic functions compatible with the host cryptography software, at least one biometric processing application installed in non-volatile memory and an enrollment biometric template associated with a live entity also stored in non-volatile memory.

The enrollment biometric template includes a private portion and a pre-match data portion. The pre-match data portion may be generated as needed or separately stored in memory after initial generation. The pre-match data portion comprises the biometric challenge issued by the security token 90 and includes in one embodiment of the invention, information related to minutia locations, triangles derived from minutia locations and ridge spacing. In alternate embodiment of the invention, the challenge includes information related to pixel values and image quality. In yet other embodiments of the invention, no challenge is required for processing of the incoming biometric sample.

The at least one biometric processing application includes the ability to send the biometric challenge to the intelligent biometric scanner, receive an entity biometric template from the intelligent biometric scanner, compare the entity biometric template to the enrollment biometric template and determine if an affirmative match exists between the entity biometric template and the enrollment biometric template.

An affirmative match exists if biometric features of interest extracted from the biometric sample match within acceptable tolerance ranges for false rejection and false acceptance rates, the biometric features of interest included in the enrollment template. Other security requirements may affect the affirmative match criteria as well. Lastly, the at least one biometric processing application further includes the ability to signal the computer system that an affirmative match has been made.

Signaling of the computer system may be accomplished through the intelligent biometric scanner or directly.

Figure 2:
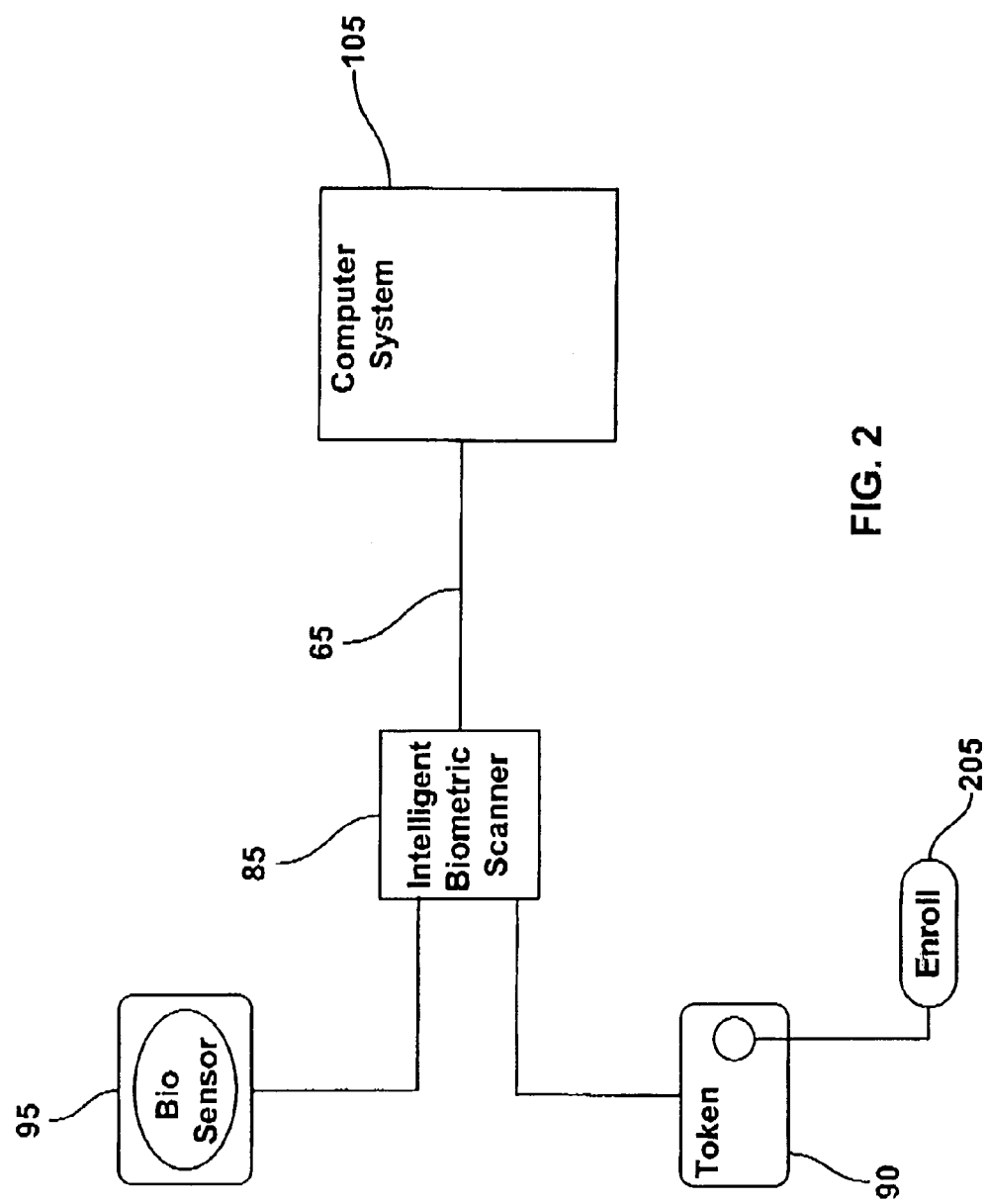
FIG. 2—is a detailed block diagram of an embodiment of the invention.

Referring to FIG. 2, a basic embodiment of the invention is shown where an intelligent biometric scanner 85 is shown electromagnetically coupled 65 to a computer system 105. The intelligent biometric scanner 85 has electromagnetically coupled thereto a biometric sensor 95 and a security token 90, and includes the ability to perform data transformations for all outgoing biometric sample data and reverse data transformations on all incoming biometric data. The security token includes an enrollment biometric template 205 operatively stored in token memory.

Figure 3:
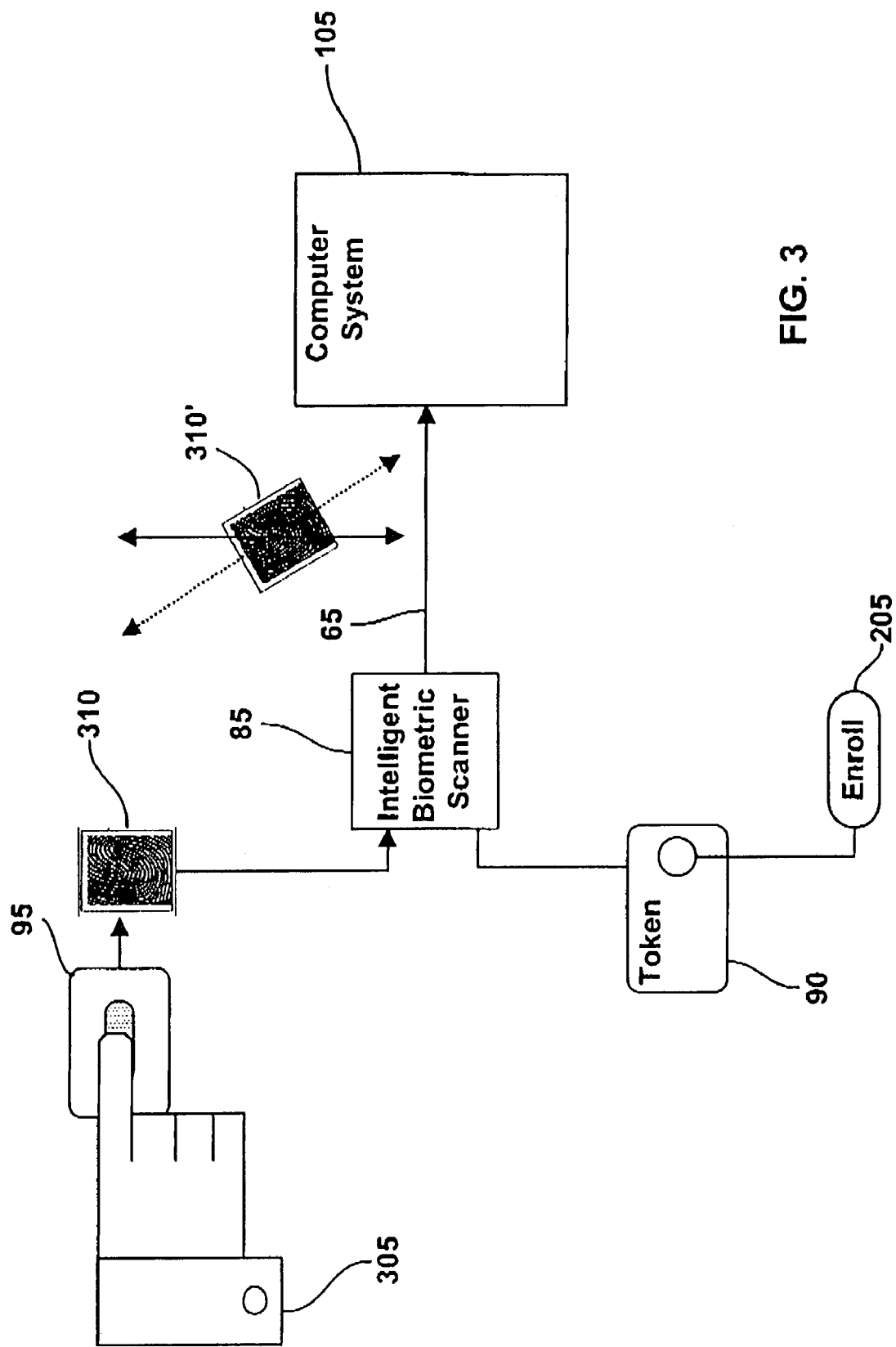
FIG. 3—is a detailed block diagram of a basic embodiment of the invention depicting the transfer of a transformed biometric sample from an intelligent biometric scanner to a computer system.

Referring to FIG. 3, another basic embodiment of the invention is shown where a live entity 305 enters a biometric sample 310 into a biometric sensor 95. The biometric sample 310 is sent to the intelligent biometric scanner 85 where the intelligent biometric scanner 85 applies a data transformation to the entered biometric sample 310, resulting in a transformed biometric sample 310'. The transformed biometric sample 310' is then sent 65 to the computer system 105 for processing. The returned processed result is described in the discussion included for FIG. 4 below.

In this basic embodiment of the invention, the transformation is retained for the duration of an active session and applied to all outgoing biometric sample data sent 65 to the computer system 105 from the intelligent biometric scanner 85.

The transformation is performed randomly at the end of each session so as to prevent an unauthorized entity from predicting which transformation is being performed and may include either or both an alignment change, such as a rotation in an associated coordinate system or a pixel inversion, whereby a specific biometric feature such as a ridge ending is transformed into a bifurcation and vice versa.

Figure 3A:
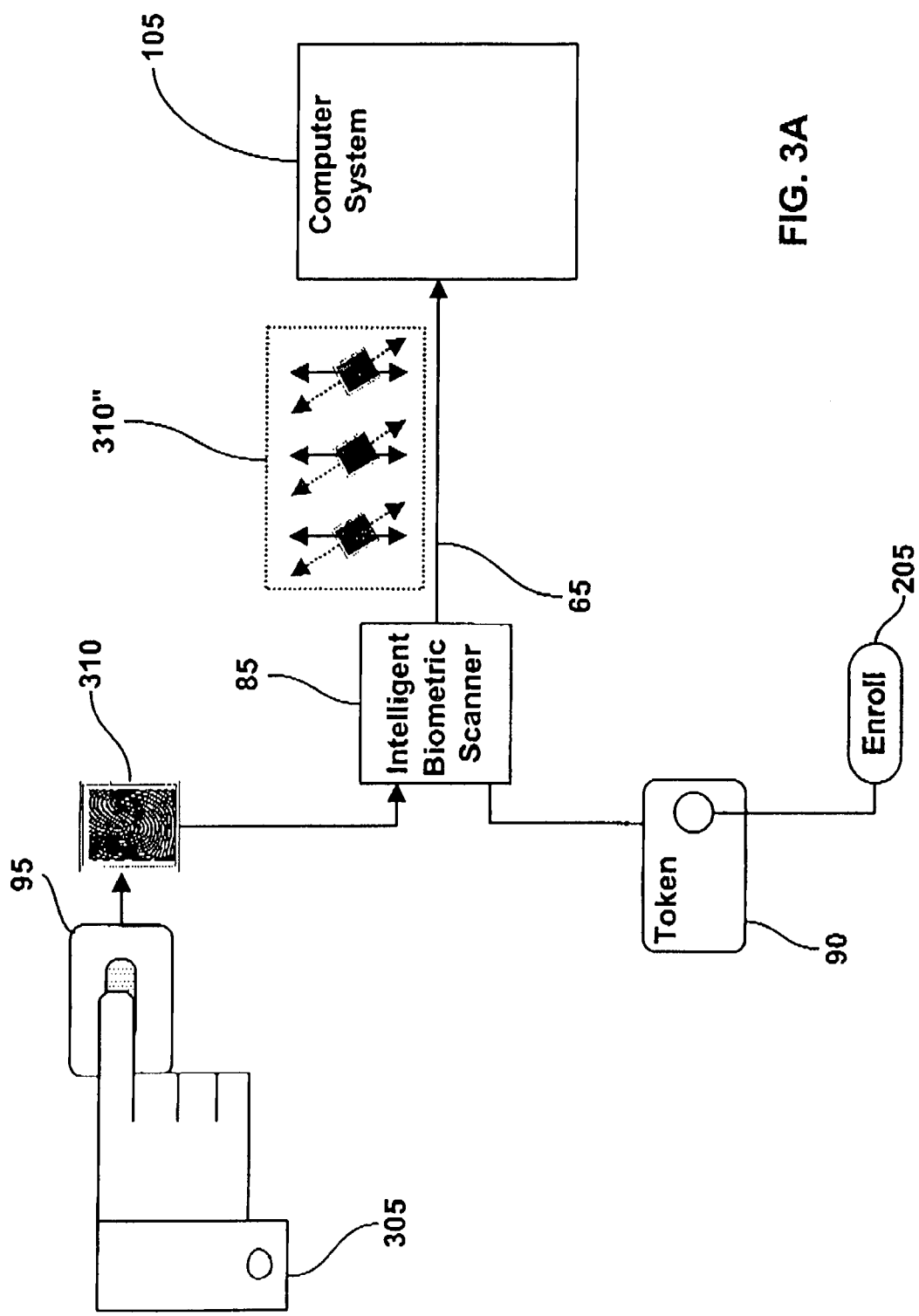
FIG. 3A—is a detailed block diagram of an alternate embodiment of the invention depicting the transfer of a series transformed sample parts from an intelligent biometric scanner to a computer system.

Referring to FIG. 3A, an alternate embodiment of the invention is shown where, as before, the live entity 305 enters a biometric sample 310 into the biometric sensor 95. The biometric sample 310 is sent to the intelligent biometric scanner 85, where the intelligent biometric scanner 85 applies a data transformation to the entered biometric sample 310 and further divides the transformed biometric sample into a plurality of transformed sample parts 310". The transformed sample parts 310" are sequentially sent 65 to the computer system 105 for processing. In this embodiment of the invention, the transformation is performed randomly at either the end of each session or after each sample part is sent to the computer system. The at least one biometric processing application included in the intelligent biometric scanner 85 keeps track of which sample parts have been transformed and the type of data transformation performed on each transformed sample data part to allow sequential reversal of incoming result data parts. The sequentially returned processed results are described in the discussion included for FIG. 4A below.

Figure 3B:
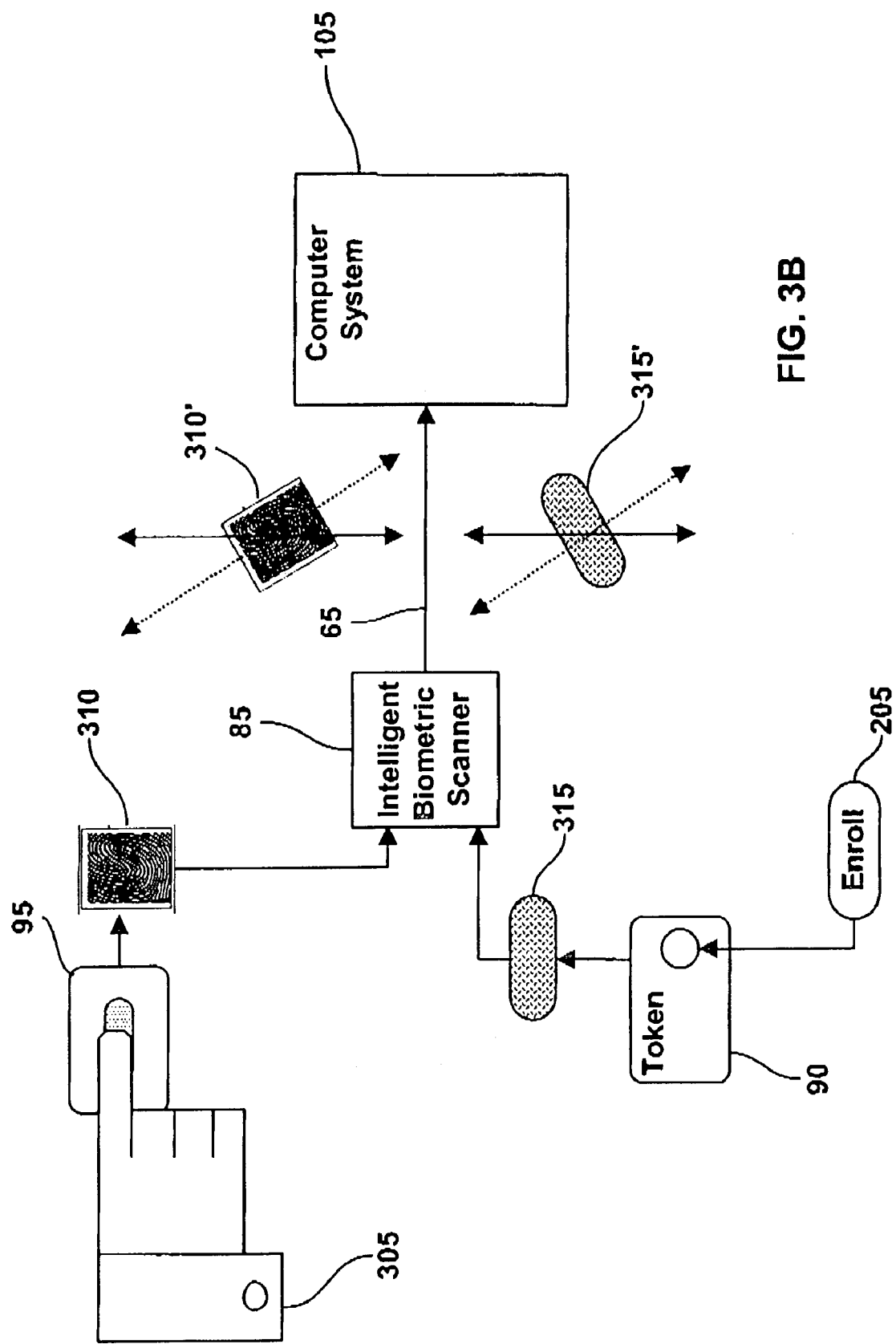
FIG. 3B—is a detailed block diagram of another embodiment of the invention depicting the transfer of a transformed challenge and a transformed biometric sample from an intelligent biometric scanner to a computer system.

Referring to FIG. 3B, another alternate embodiment of the invention is shown where, again, the live entity 305 enters a biometric sample 310 into the biometric sensor 95. In this embodiment of the invention, a biometric challenge 315 is either generated or retrieved from the security token 90 and sent to the intelligent biometric scanner 85 along with the biometric sample 310. The intelligent biometric scanner 85 applies a data transformation to the entered biometric sample 310 and biometric challenge resulting in the transformed biometric sample 310' and transformed biometric challenge 315'. The transformed biometric sample 310' and transformed biometric challenge 315' are sent 65 to the computer system 105 for processing.

The transformed biometric challenge 315' is used in the processing of the transformed biometric sample to specify one or more biometric features to be extracted and incorporated into a transformed entity biometric template. For this embodiment of the invention, the returned processed result is described in the discussion included for FIG. 4 below as well.

Figure 3C:
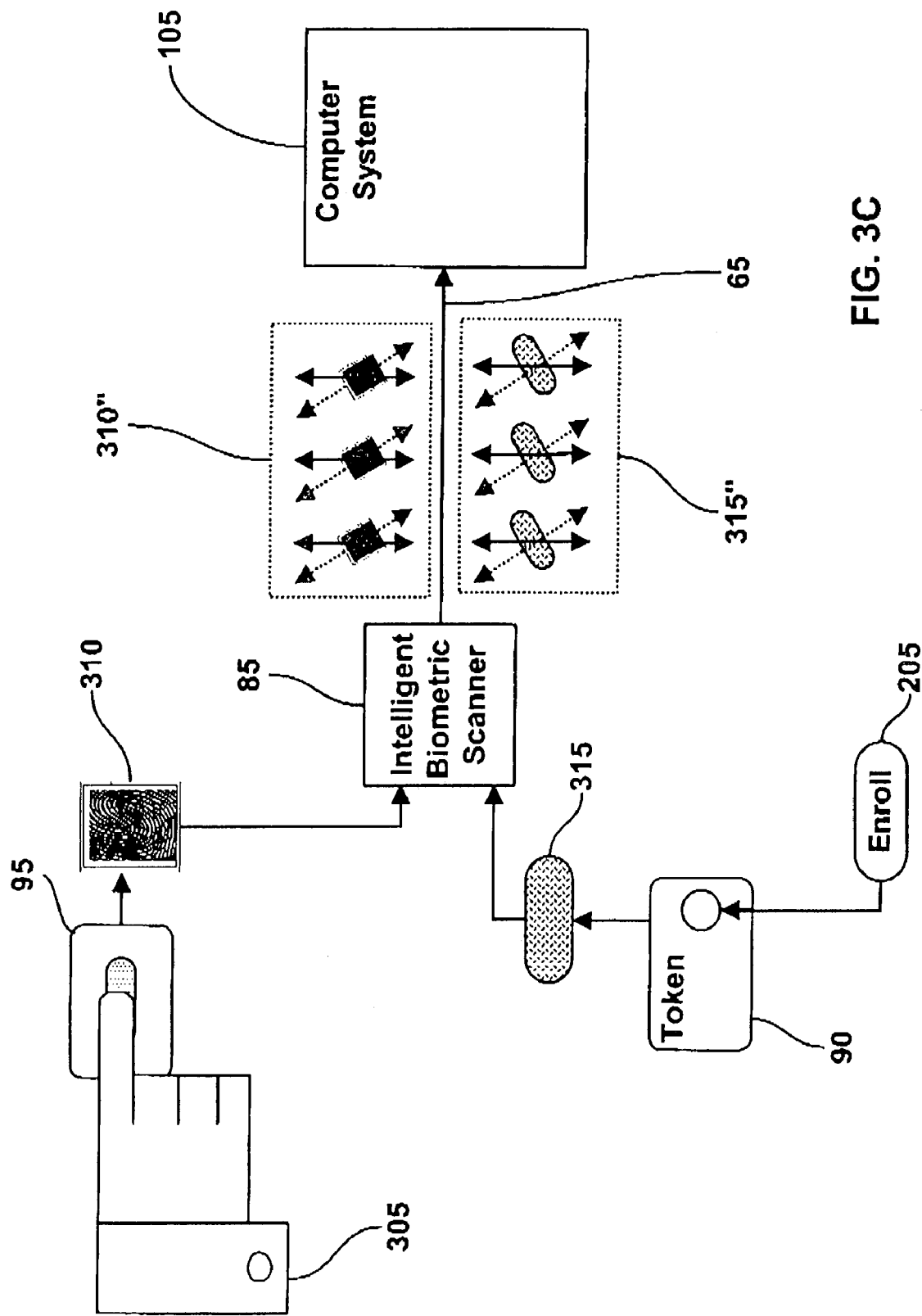
FIG. 3C—is a detailed block diagram of another embodiment of the invention depicting the transfer of a series transformed sample parts and corresponding challenge parts from an intelligent biometric scanner to a computer system.

Referring to FIG. 3C, another alternate embodiment of the invention is shown where, as before, the live entity 305 enters a biometric sample 310 into the biometric sensor 95. In this embodiment of the invention, the biometric challenge 315 is either generated or retrieved from the security token 90 and sent to the intelligent biometric scanner 85 along with the biometric sample 310. The intelligent biometric scanner 85 applies a data transformation to the entered biometric sample 310 and provided biometric challenge 315 and divides the transformed biometric sample and the transformed biometric challenge into a plurality of transformed sample parts 310" and a plurality of corresponding challenge parts 315" which are sequentially sent 65 to the computer system 105 for processing. In this embodiment of the invention, the at least one biometric processing application included in the intelligent biometric scanner 85 keeps track of which sample parts have been transformed and the type of data transformation performed on each transformed sample data part to allow sequential reversal of incoming result data parts. The sequentially returned processed results are described in the discussion included for FIG. 4A below.

Figure 4:
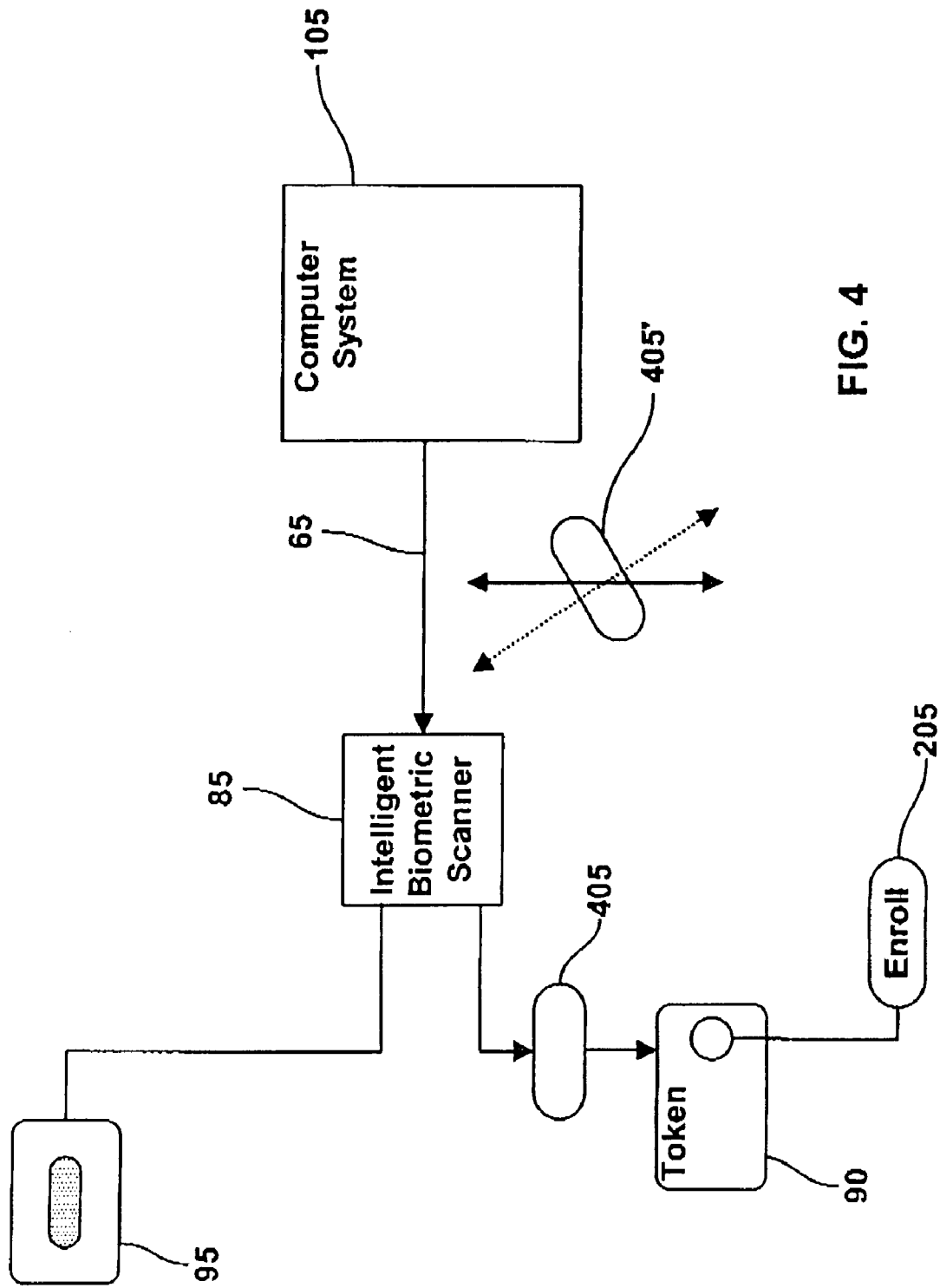
FIG. 4—is a detailed block diagram of a basic embodiment of the invention depicting the return of a transformed entity biometric template to the intelligent biometric scanner.

Referring to FIG. 4, the computer system 105 processes the transformed biometric sample 310', generating a transformed entity biometric template 405'. The transformed entity biometric template 405' is returned 65 to the intelligent biometric scanner 85, where the initial transformation is reversed, resulting in an entity biometric template 405. The entity biometric template 405 is then sent to the security token 90 for comparison with the enrollment biometric template 205.

The transformation prevents a replayed biometric template or an electronically intercepted biometric sample from matching the enrollment template 205 stored inside the security token 90, since all returned biometric data from the computer system 105 undergoes the transformation process by the intelligent biometric scanner 85. Any data which lacks the original transformation will not match the enrollment biometric template 205.

Figure 4A:
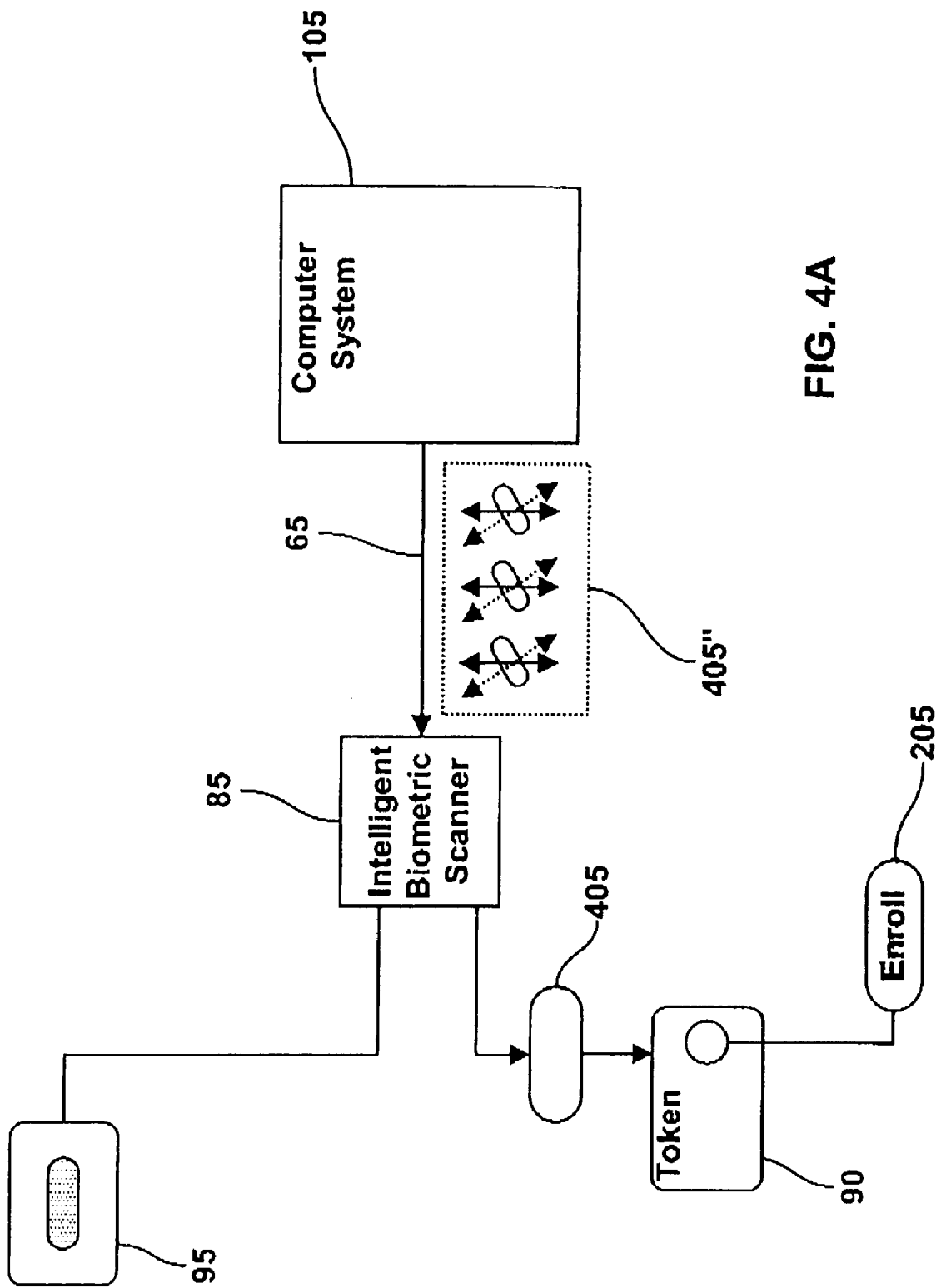
FIG. 4A—is a detailed block diagram of the invention depicting the transfer of a of a series transformed entity biometric template parts from an intelligent biometric scanner to a computer system.

Referring to FIG. 4A, the computer system sequentially processes the incoming sample parts 310" using the corresponding challenge parts 315" to specify one or more biometric features to be extracted and incorporated into a plurality of transformed entity template parts 405'. The transformed entity template parts 405" are sequentially returned to the intelligent biometric scanner 85, assembled and transformed into the entity biometric template 405. The entity biometric template 405 is then sent to the security token 90 for comparison with the enrollment biometric template 205.

Figure 5:
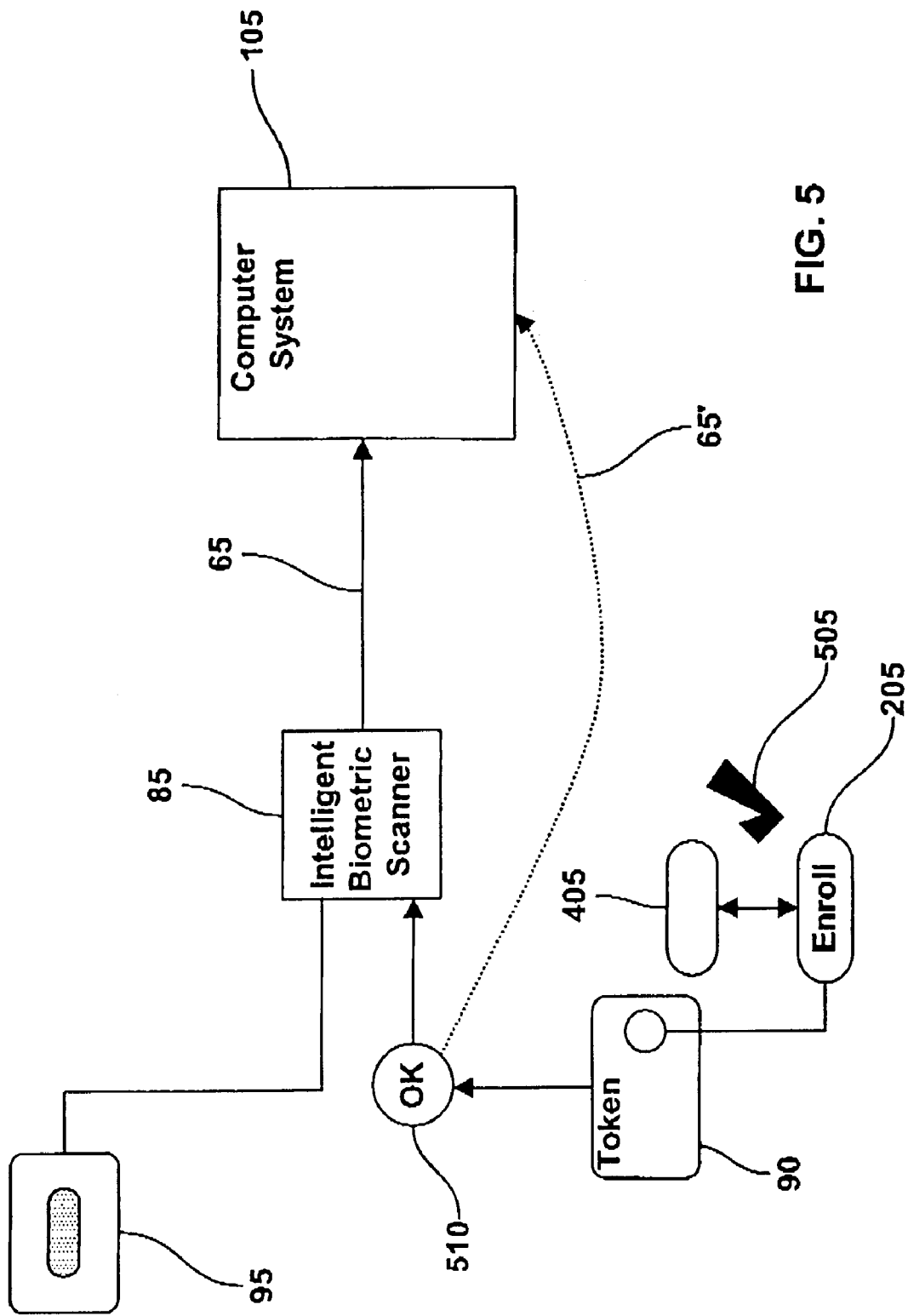
FIG. 5—is a detailed block diagram of a basic embodiment of the invention depicting a successful match by a security token using an entity biometric template.

Referring to FIG. 5, if the entity biometric template 405 affirmatively matches the enrollment template 205, an affirmative signal 510 is sent 65 to the computer system 105 either via the intelligent biometric scanner 85 or directly 65' if supported by the specific communications interface described in FIG. 1. Upon receipt of the affirmative signal 510, the computer system 105 allows the live entity access to at least one security function.

Figure 6:
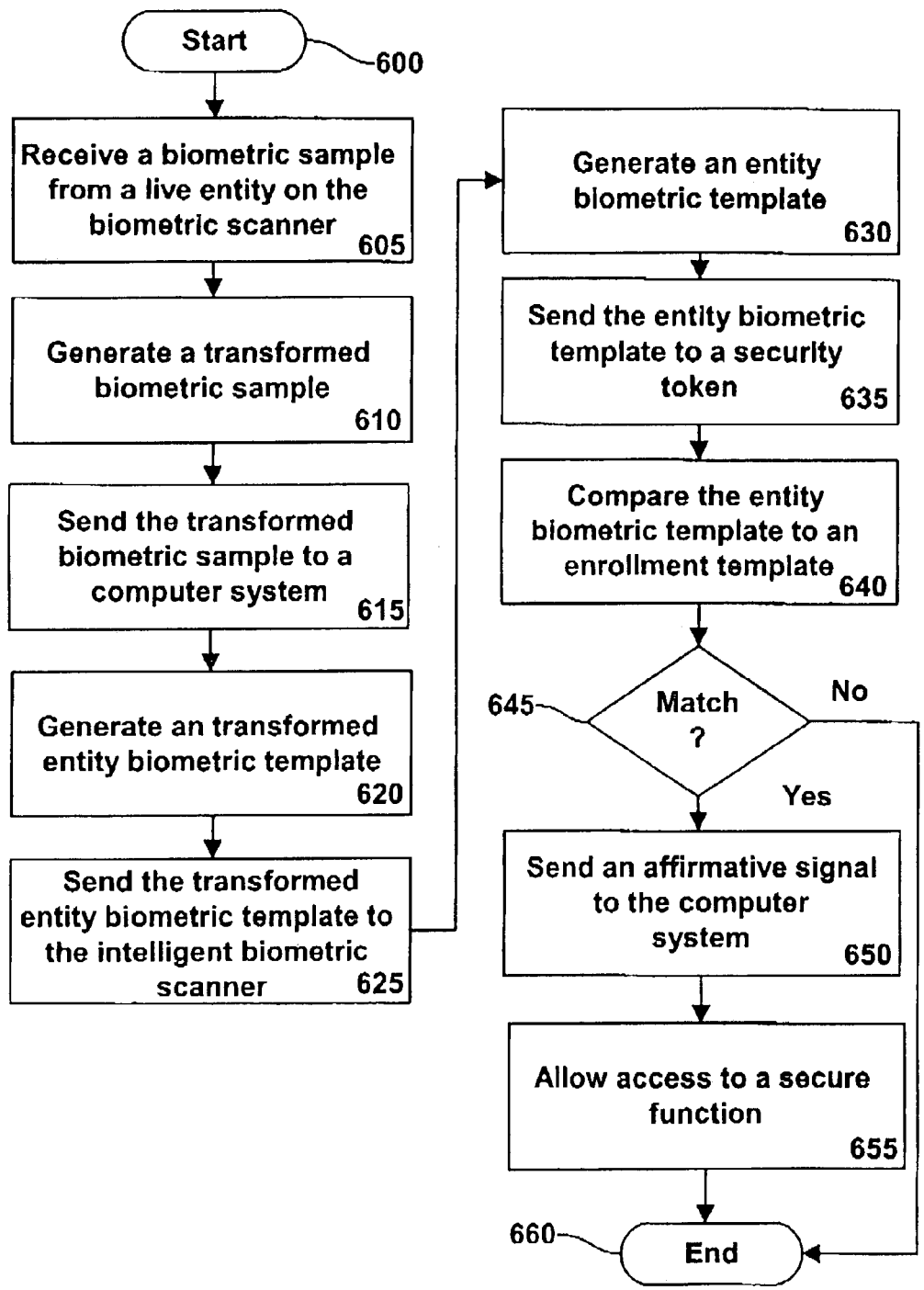
FIG. 6—is a flow chart depicting the major steps involved in implementing a basic embodiment of the invention.

Referring to FIG. 6, the process for implementing the basic embodiment of the invention is initiated 600 by receiving a biometric sample from a live entity on a biometric sensor associated with the biometric scanner 605. The biometric sample is transformed using a data transformation 610 and sent to a computer system for processing 615.

The computer system generates a transformed entity biometric template 620 which is sent to the intelligent biometric scanner for processing 625. The intelligent biometric scanner, reverses the transformation resulting in an entity biometric template 630. The entity biometric template is then sent to a security token for final processing 635. The received entity biometric template is then compared to an enrollment biometric template 640. If no affirmative match is obtained 645, processing ends 660 and the entity is denied access to one or more secure functions. If an affirmative match is obtained 645, the security token sends an affirmative signal to the computer system 650. The computer system upon receiving the affirmative signal, allows access to the one or more security functions 655 followed by normal processing termination 660. In an alternate embodiment of the invention, the processing capabilities of the intelligent biometric scanner are performed by the security token.

Figure 6A:
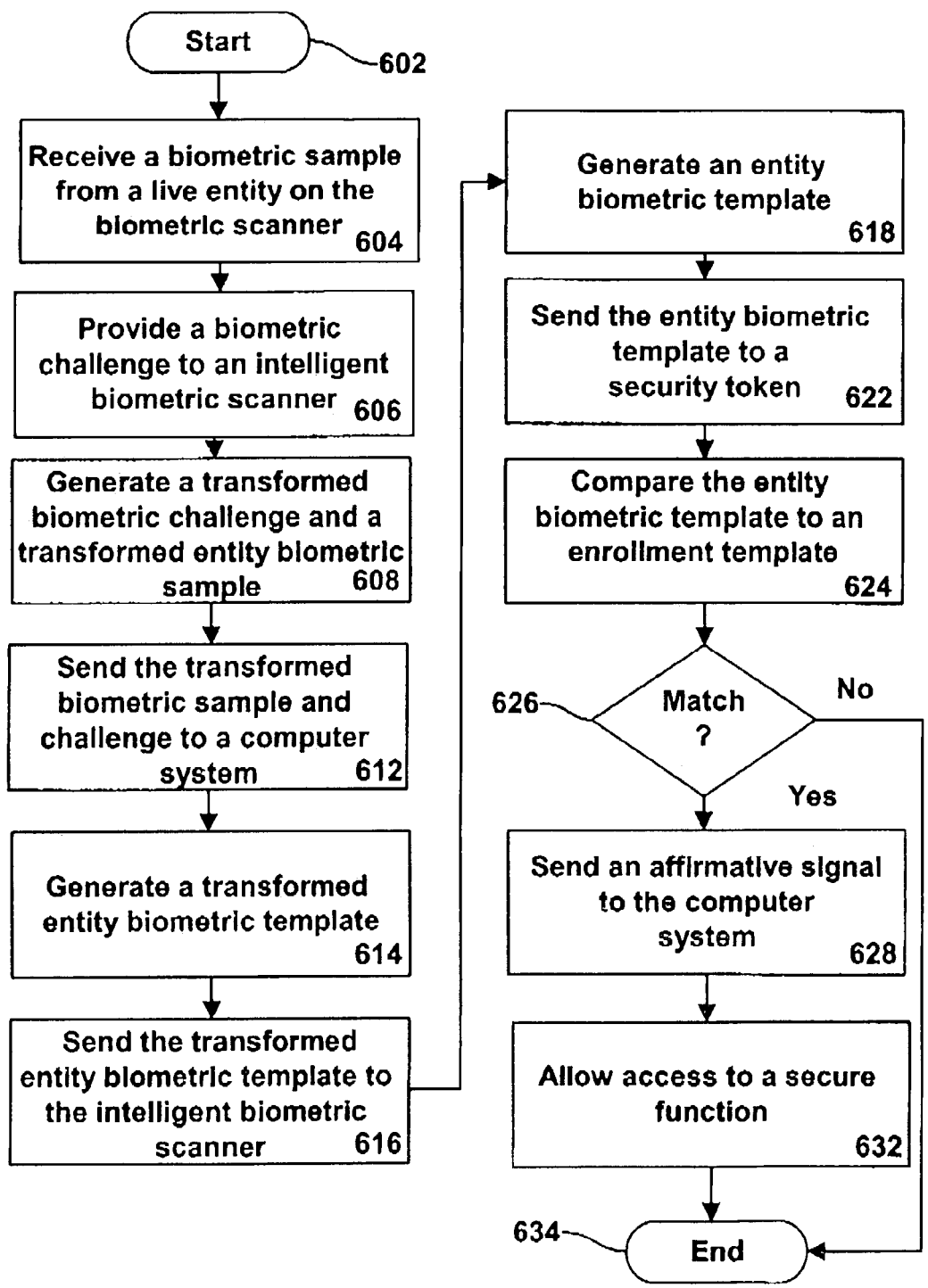
FIG. 6A—is a flow chart depicting the major steps involved in implementing an alternate embodiment of the invention.

Referring to FIG. 6A, the process for implementing an alternate embodiment of the invention is initiated 602 by receiving a biometric sample from a live entity on a biometric sensor associated with the biometric scanner 604 and providing a biometric challenge to an intelligent biometric scanner 606. Both the biometric sample and biometric challenge are transformed using a data transformation 608 and sent to a computer system for processing 612. The computer system generates a transformed entity biometric template 614 which is sent to the intelligent biometric scanner for processing 616.

The intelligent biometric scanner, reverses the transformation, resulting in an entity biometric template 618. The entity biometric template is then sent to a security token for final processing 622. The received entity biometric template is then compared to an enrollment biometric template 624. If no affirmative match is obtained 626, processing ends 634 and the entity is denied access to one or more secure functions. If an affirmative match is obtained 626, the security token sends an affirmative signal to the computer system 628. The computer system upon receiving the affirmative signal allows access to the one or more security functions 632, followed by normal processing termination 634. In an alternate embodiment of the invention, the processing capabilities of the intelligent biometric scanner are performed by the security token.

Figure 6B:
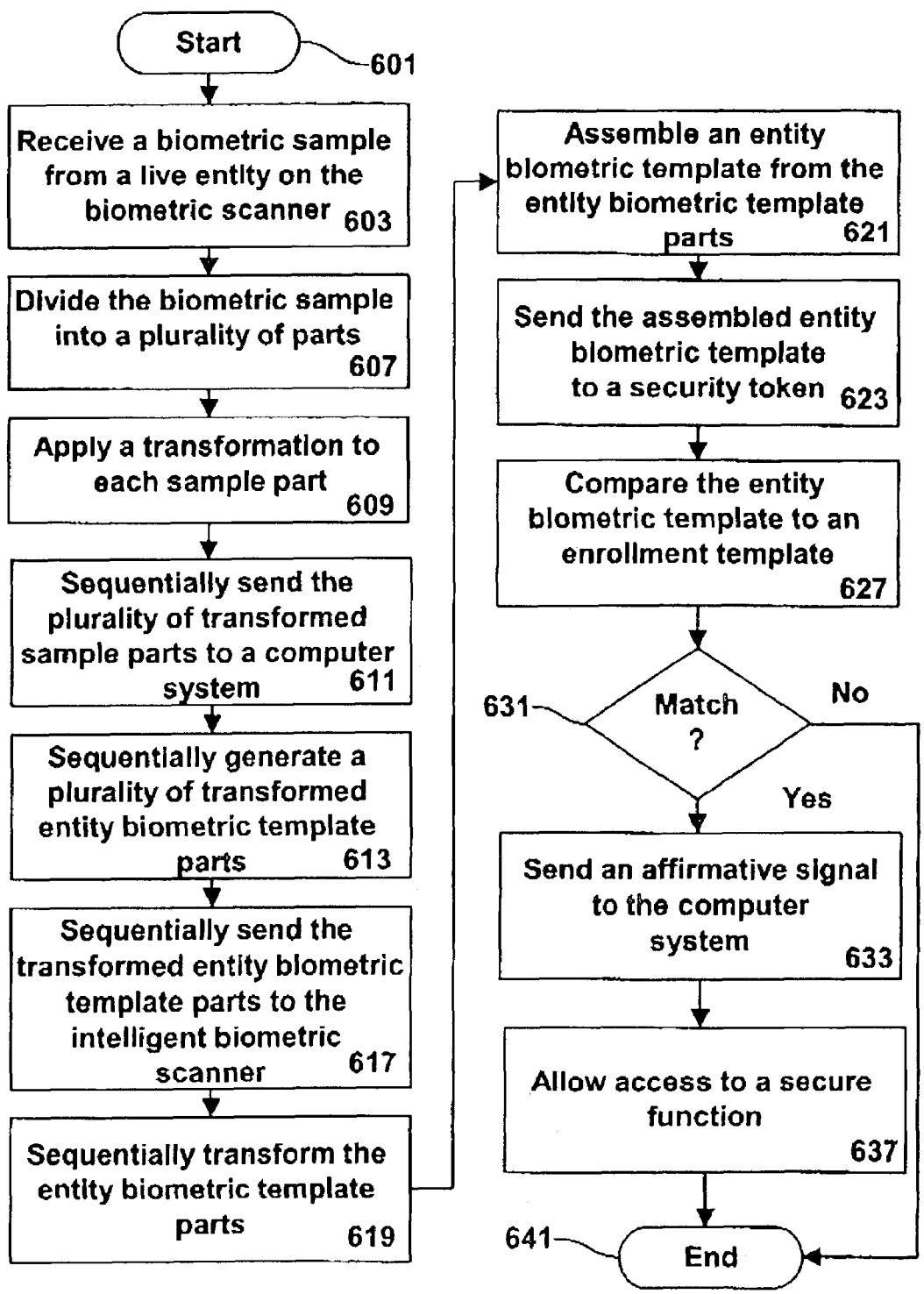
FIG. 6B—is a flow chart depicting the major steps involved in implementing another alternate embodiment of the invention.

Referring to FIG. 6B, the process for implementing yet another embodiment of the invention is initiated 601 by receiving a biometric sample from a live entity on a biometric sensor associated with the biometric scanner 603. The biometric sample is divided into a plurality of sample parts 607, then transformed using a data transformation 609. The transformation may be applied uniformly to all sample parts or varied among individual sample parts. The transformed sample parts are then encapsulated into data packets and sequentially sent to a computer system for processing 611. The computer system sequentially generates a plurality of entity biometric template parts 613, which are sequentially sent to the intelligent biometric scanner for processing 617. The intelligent biometric scanner sequentially reverses the initial transformation applied to the sample parts 619 and assembles the plurality of entity biometric template parts into a transformed entity biometric template 621. The entity biometric template is then sent to a security token for final processing 623. The received entity biometric template is then compared to an enrollment biometric template 627. If no affirmative match is obtained 631, processing ends 641 and the entity is denied access to one or more secure functions.

If an affirmative match is obtained 631, the security token sends an affirmative signal to the computer system 633. The computer system upon receiving the affirmative signal allows access to the one or more security functions 637, followed by normal processing termination 641. In an alternate embodiment of the invention, the processing capabilities of the intelligent biometric scanner are performed by the security token.

Figure 6C:
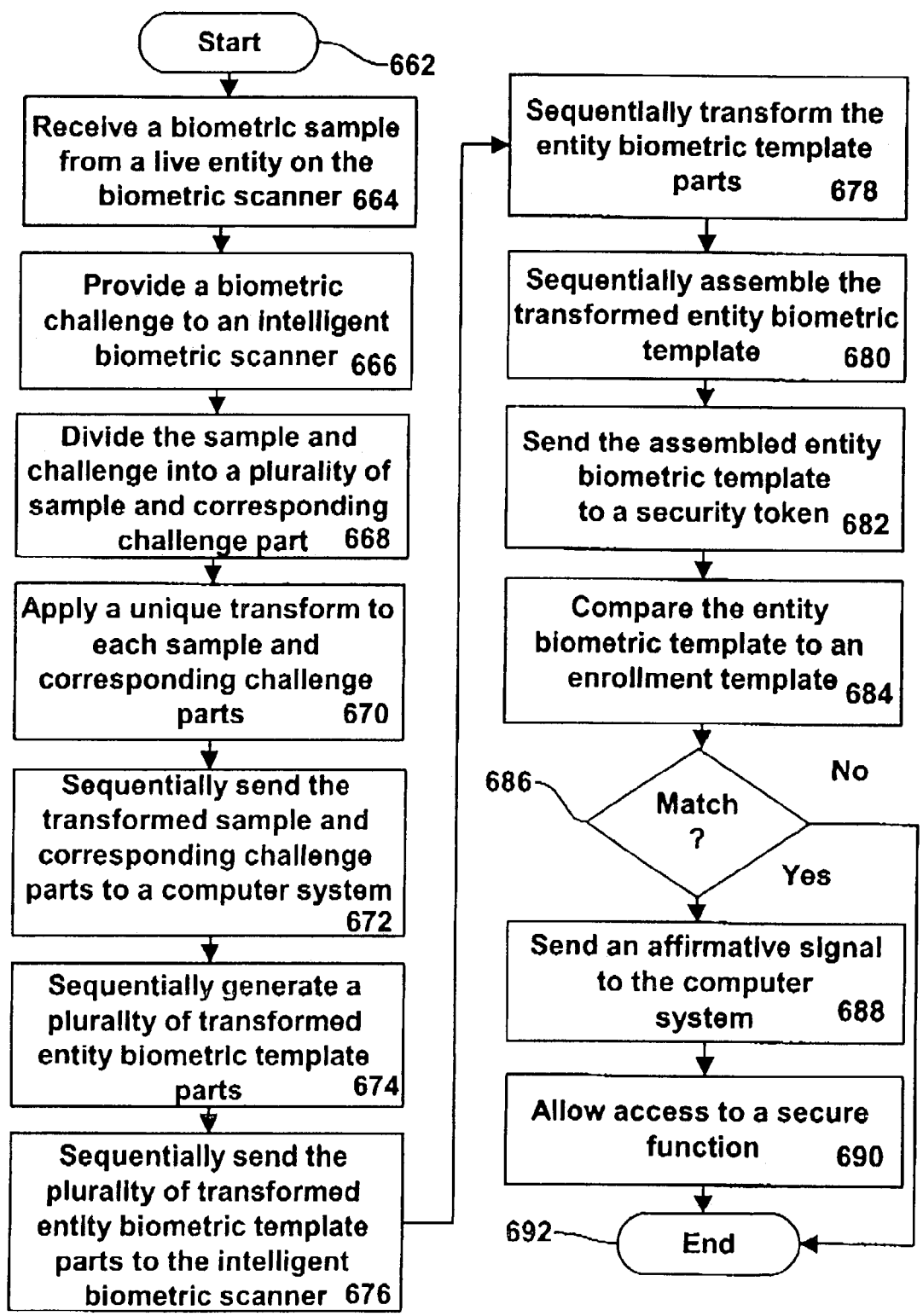
FIG. 6C—is a flow chart depicting the major steps involved in implementing yet another alternate embodiment of the invention.

Referring to FIG. 6C, the process for implementing yet another embodiment of the invention is initiated 662 by receiving a biometric sample from a live entity on a biometric sensor associated with the biometric scanner 664 and providing a biometric challenge to an intelligent biometric scanner 666 from a security token. The biometric sample and biometric challenge are divided into a plurality of sample and corresponding challenge parts 668. A data transformation is then applied to each sample and corresponding challenge part 670. The transformation may be applied uniformly to all sample parts or varied among individual sample parts. However, in this embodiment of the invention, the same data transformation needs to be applied to both the sample part and its corresponding challenge part. The transformed sample and challenge parts are then encapsulated into a plurality of data packets and sequentially sent to a computer system for processing 672. The computer system sequentially generates a plurality of entity biometric template parts 674, which are sequentially sent to the intelligent biometric scanner for processing 676. The intelligent biometric scanner sequentially reverses the transformations applied to the individual sample parts 678 and assembles the plurality of entity biometric template parts into a transformed entity biometric template 680. The entity biometric template is then sent to a security token for final processing 682. The received entity biometric template is then compared to an enrollment biometric template 684. If no affirmative match is obtained 686, processing ends 692 and the entity is denied access to one or more secure functions. If an affirmative match is obtained 686, the security token sends an affirmative signal to the computer system 688.

The computer system upon receiving the affirmative signal allows access to the one or more security functions 690, followed by normal processing termination 692. In an alternate embodiment of the invention, the processing capabilities of the intelligent biometric scanner are performed by the security token.

Figure 6D:
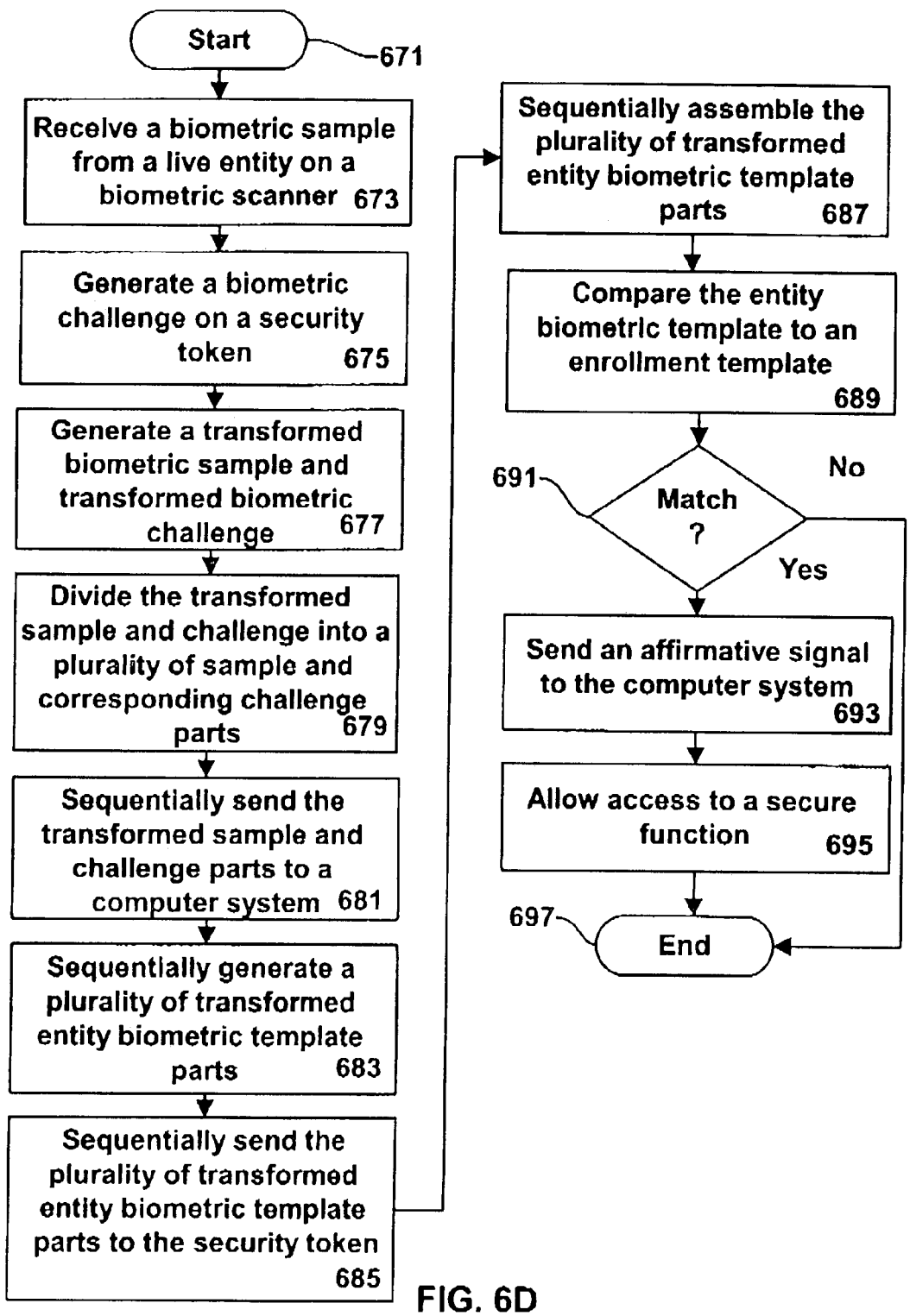
FIG. 6D—is a flow chart depicting the major steps involved in implementing a final alternate embodiment of the invention.

Referring to FIG. 6D, the process for implementing a final embodiment of the invention is initiated 671 by receiving a biometric sample from a live entity on a biometric sensor associated with the biometric scanner 673 and providing a biometric challenge to a security token 675. The biometric sample and biometric challenge are transformed by the security token using a data transformation 677, and divided into a plurality of transformed sample parts and a plurality of corresponding challenge parts 679. The sample and challenge data parts are sequentially sent to a computer system for processing 681. The computer system sequentially generates a plurality of entity biometric template parts 683 which are sequentially sent to the security token for processing 685. The security token sequentially assembles the plurality of entity biometric template parts into a transformed entity biometric template 687. The security token, then reverses the transformation resulting in an entity biometric template 689. The entity biometric template is then compared to an enrollment biometric template 691. If no affirmative match is obtained 693, processing ends 699 and the entity is denied access to one or more secure functions. If an affirmative match is obtained 693, the security token sends an affirmative signal to the computer system 688. The computer system upon receiving the affirmative signal allows access to the one or more security functions 695, followed by normal processing termination 697.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks. No specific limitation is intended to a particular security token operating environment. Other variations and embodiments are possible in light of above teachings, and it is not intended that this Detailed Description limit the scope of invention, but rather by the Claims following herein.

What is claimed is:

1. A method for ensuring an entity biometric template is associated with a live entity, comprising:
    generating, via a security token, a transformed biometric sample by applying a data transformation to at least a portion of a biometric sample received from a live entity, wherein said data transformation comprises at least a pixel inversion, a translation, a rotation, a mirror image or a coordinate system deviation;
    sending, via the security token, the transformed biometric sample to a computer that generates a transformed entity biometric template by extracting one or more biometric features included in said transformed biometric sample and sends the transformed entity biometric template to the security token;
    reversing, via the security token, said data transformation incorporated into said transformed entity biometric template; and
    generating, via the security token, an entity biometric template before attempting to compare said entity biometric template to an enrollment biometric template.

2. The method according to claim 1 further comprising randomly varying a type of said data transformation after a session.

3. The method according to claim 1 wherein generating a transformed biometric sample further comprises generating a transformed biometric challenge by applying the data transformation to a biometric challenge issued by said security token.

4. The method according to claim 3 wherein at least a portion of extracting said one or more biometric features is specified by said transformed biometric challenge.

5. The method according to claim 1 further comprising:
    dividing said biometric sample into a plurality of sample parts;
    sequentially transforming said plurality of sample parts;
    sequentially generating a plurality of transformed entity biometric template parts by sequentially extracting one or more biometric features included in said plurality of transformed sample parts; and
    sequentially assembling said plurality of entity biometric template parts into said transformed entity biometric template.

6. The method according to claim 5 further comprising randomly varying said data transformation for each transformed sample part included in said plurality of transformed sample parts.

7. The method according to claim 1 further comprising:
    dividing said transformed biometric sample into a plurality of transformed sample parts;
    sequentially generating a plurality of transformed entity biometric template parts by sequentially extracting one or more biometric features included in said plurality of transformed sample parts; and
    sequentially assembling said plurality of transformed entity biometric template parts into said transformed entity biometric template.

8. The method according to claim 7 further comprising randomly varying said data transformation for each transformed sample part included in said plurality of transformed sample parts.

9. The method according to claim 1, further comprising:
    comparing said entity biometric template to said enrollment biometric template;
    sending an affirmative signal to said computer if said entity biometric template matches said enrollment biometric template; and
    allowing said live entity access to at least one secure function following receipt of said affirmative signal.

10. A method for ensuring an entity biometric template is associated with a live entity, comprising:
    generating, via a security token, a transformed biometric sample and transformed biometric challenge by applying a data transformation to at least a portion of a biometric sample and a biometric challenge, wherein said data transformation is comprised of at least pixel inversion, a translation, a rotation, a mirror image or a coordinate system deviation;
    sending, via the security token, the transformed biometric sample and transformed biometric challenge to a computer that generates a transformed entity biometric template by extracting one or more biometric features specified by said transformed biometric challenge from said transformed biometric sample and sends the transformed entity biometric template to the security token;
    reversing, via the security token, said data transformation incorporated into said transformed entity biometric template; and
    generating, via the security token, an entity biometric template before attempting to compare said entity biometric template to an enrollment biometric template.

11. The method according to claim 10 further comprising randomly varying the type of said data transformation after a session.

12. The method according to claim 10 further comprising:
    comparing said entity biometric template to said enrollment biometric template;
    sending an affirmative signal to the computer if said entity biometric template matches said enrollment biometric template; and
    allowing said live entity access to at least one secure function following receipt of said affirmative signal.

13. A method for ensuring an entity biometric template is associated with a live entity, comprising:
    dividing, via a security token, a biometric sample into a plurality of sample parts;
    applying, via the security token, a data transformation to at least a portion of said sample parts, wherein said data transformation is comprised of at least pixel inversion, a translation, a rotation, a mirror image or a coordinate system deviation;
    sending, via the security token, the transformed biometric sample parts to a computer that generates a plurality of transformed entity biometric template parts by extracting one or more biometric features included in said at least a portion of said sample parts and sends the transformed entity biometric template parts to the security token;
    reversing, via the security token, said data transformation incorporated into said plurality of transformed entity biometric template parts; and
    assembling, via the security token, said plurality of entity biometric template parts into an entity biometric template.

14. The method according to claim 13 further comprising randomly varying said data transformation for each transformed sample part included in said plurality of transformed sample parts.

15. The method according to claim 13 further comprising randomly varying the type of said data transformation after a session.

16. The method according to claim 13 further comprising:
comparing said entity biometric template to said enrollment biometric template;
sending an affirmative signal to the computer if said entity biometric template matches said enrollment biometric template; and
allowing said live entity access to at least one secure function following receipt of said affirmative signal.

17. The method according to claim 13, wherein the generating, extracting and assembling are each performed sequentially.

18. A method for ensuring an entity biometric template is associated with a live entity, comprising:
generating, via a security token, a transformed biometric sample and a transformed biometric challenge by applying a data transformation to at least a portion of a generated biometric challenge and a biometric sample received from a live entity, wherein said data transformation is comprised of at least pixel inversion, a translation, a rotation, a mirror image or a coordinate system deviation;
dividing, via the security token, said transformed biometric sample and said transformed biometric challenge into a plurality of transformed sample parts and a plurality of corresponding challenge parts;
sending, via the security token, the transformed sample parts and transformed challenge parts to a computer that generates a plurality of transformed entity biometric template parts by extracting at least a portion of one or more biometric features from said plurality of transformed sample data parts specified by said plurality of corresponding challenge parts;
receiving, via the security token, said plurality of transformed entity biometric template parts that have been assembled by said computer into a transformed entity biometric template and sent to the security token;
reversing, via the security token, said data transformation incorporated into said transformed entity biometric template; and
generating, via the security token, an entity biometric template before attempting to compare said entity biometric template to an enrollment biometric template.

19. The method according to claim 18 further comprising randomly varying said data transformation for each transformed sample part included in said plurality of transformed sample parts.

20. The method according to claim 18 further comprising randomly varying the type of said data transformation after a session.

21. The method according to claim 18 further comprising:
comparing said entity biometric template to said enrollment biometric template;
sending an affirmative signal to the computer if said entity biometric template matches said enrollment biometric template; and
allowing said live entity access to at least one secure function following receipt of said affirmative signal.

22. The method according to claim 18, wherein the generating, extracting and assembling are each performed sequentially.

23. A system comprising:
a biometric sensor;
a security token including:
a token processor;
a token memory coupled to the token processor and having instructions stored therein to be processed by the token processor to perform a method including:
generating a transformed biometric sample by applying a data transformation to a biometric sample inputted into said biometric sensor, wherein said data transformation comprises at least a pixel inversion a translation, a rotation, a mirror image or a coordinate system deviation;
receiving a transformed entity biometric template generated by extracting one or more biometric features included in said transformed biometric sample;
reversing said data transformation incorporated into the transformed entity biometric template; and
generating an entity biometric template.

24. The system according to claim 23 further comprising a computer system comprising:
a processor;
a memory coupled to said processor; and
at least one biometric processing application operatively installed in said memory, said at least one biometric processing application including instructions to be processed by said processor to perform a method including generating said transformed entity biometric template by extracting one or more biometric features from said transformed biometric sample.

25. The system according to claim 24 said security token further comprising:
an enrollment biometric template operatively installed in said token memory; and
at least one token biometric processing application operatively installed in said token memory, said at least one token biometric processing application including instructions to be processed by said token processor to perform a method including:
comparing said entity biometric template to said enrollment biometric template; and
sending an affirmative signal to said computer system if said entity biometric template matches said enrollment biometric template.

26. The system according to claim 25 wherein said at least one biometric processing application further includes instructions to be processed by said token processor for allowing said live entity access to at least one secure function following receipt of said affirmative signal.

27. The system according to claim 25 wherein said instructions stored in said token memory are processed by said token processor for:
dividing said biometric sample into a plurality of sample parts; and
sequentially transforming said plurality of sample parts; and
wherein said computer system includes instructions stored in said memory for causing said processor to:
sequentially generate a plurality of transformed entity biometric template parts by sequentially extracting one or more biometric features included in said plurality of transformed sample parts; and
sequentially assemble said plurality of entity biometric template parts into said transformed entity biometric template.

28. The system according to claim 27 wherein said instructions stored in said token memory are processed by said token processor for randomly varying said data transformation for each transformed sample part included in said plurality of transformed sample parts.

29. The system according to claim 23 wherein the type of said data transformations is randomly varied after a session.

30. A system comprising:
a biometric sensor;
a security token including:
  a token processor;
    a token memory coupled to the token processor and having instructions stored therein to be processed by the token processor to perform a method including:
    generating a transformed biometric sample and a transformed biometric challenge by applying a data transformation to a generated biometric challenge and a biometric sample inputted into said biometric sensor, wherein said data transformation is comprised of at least a pixel inversion a translation, a rotation, a mirror image or a coordinate system deviation;
    receiving a transformed entity biometric template generated by extracting one or more biometric features specified by said transformed biometric challenge from said transformed biometric sample;
    reversing said data transformation incorporated into the transformed entity biometric template; and
    generating an entity biometric template.

31. The system according to claim 30 further comprising a computer system comprising:
a processor;
a memory coupled to said processor; and
at least one biometric processing application operatively installed in said memory, said at least one biometric processing application including instructions to be processed by said processor to perform a method including generating said transformed entity biometric template by extracting one or more biometric features specified by said transformed biometric challenge from said transformed biometric sample.

32. The system according to claim 31 said security token further comprising:
an enrollment biometric template operatively installed in said token memory; and
at least one token biometric processing application operatively installed in said token memory, said at least one token biometric processing application including instructions to be processed by said token processor to perform a method including:
  comparing said entity biometric template to said enrollment biometric template; and
  sending an affirmative signal to said computer system if said entity biometric template matches said enrollment biometric template.

33. The system according to claim 32 wherein said at least one biometric processing application further includes instructions to be processed by said token processor for allowing said live entity access to at least one secure function following receipt of said affirmative signal.

34. The system according to claim 31 wherein said instructions stored in said token memory are processed by said token processor for:
dividing said transformed biometric sample and said transformed biometric challenge into a plurality of transformed sample parts and a plurality of corresponding transformed challenge parts;
sequentially sending said plurality of transformed sample parts and said plurality of correspondent transformed challenge parts to said computer system;
sequentially receiving a plurality of transformed entity biometric template parts from said computer system; and
sequentially assembling said transformed entity biometric template.

35. The system according to claim 34 wherein said data transformation is randomly varied for each transformed sample part included in said plurality of transformed sample parts.

36. The system according to claim 34 wherein said instructions stored in said memory are processed by said processor for:
sequentially extracting at least a portion of one or more biometric features from said plurality of transformed sample parts specified by said plurality of corresponding transformed challenge parts; and
sequentially returning said plurality of transformed entity biometric template parts to said security token.

37. The system according to claim 30 wherein the type of said data transformation is randomly varied after a session.

38. A computer readable medium whose contents cause a computing system to perform a method for causing an intelligent biometric scan to ensure an entity biometric template is associated with a live entity, the method comprising:
apply a data transformation to at least a portion of a biometric sample before creation of an entity biometric template, wherein said data transformation is comprised of at least pixel inversion, a translation, a rotation, a mirror image or a coordinate system deviation;
receive a transformed entity biometric template generated by extraction of one or more biometric features from the transformed biometric sample;
remove said data transformation from said transformed entity biometric template; and
generate an entity biometric template before an attempt to compare said entity biometric template to an enrollment biometric template.

39. The computer program product according to claim 38, further comprising generating a transformed biometric challenge by applying the data transformation to a biometric challenge issued by the security token.

40. The computer-readable medium of claim 39, wherein at least a portion of extracting said one or more biometric features is specified by said transformed biometric challenge.

41. The computer-readable medium of claim 38, further comprising:
dividing said biometric sample into a plurality of sample parts; and
sequentially transforming said plurality of sample parts.

42. The computer-readable medium of claim 41, further comprising causing said processor to randomly vary said data transformation for each transformed sample part included in said plurality of transformed sample parts.

43. The computer-readable medium of claim 38, further comprising causing said processor to divide said transformed biometric sample into a plurality of transformed sample parts.

44. The computer-readable medium of claim 43, further comprising causing said processor to randomly vary said data transformation for each transformed sample part included in said plurality of transformed sample parts.

45. The computer-readable medium of claim 38, further comprising:
comparing said entity biometric template to said enrollment biometric template;

sending an affirmative signal to a computer system if said entity biometric template matches said enrollment biometric template; and allowing said live entity access to at least one secure function following receipt of said affirmative signal.

46. A system comprising:

a biometric sensor; and a security token including:

means for generating a transformed biometric sample by applying a data transformation to a biometric sample inputted into said biometric sensor, wherein said data transformation comprises at least a pixel inversion a translation, a rotation, a mirror image or a coordinate system deviation;

means for receiving a transformed entity biometric template generated by extracting one or more biometric features included in said transformed biometric sample;

means for reversing said data transformation incorporated into the transformed entity biometric template; and means for generating an entity biometric template.

47. The system according to claim 46 further comprising a computer system comprising means for generating said transformed entity biometric template by extracting one or more biometric features from said transformed biometric sample.

48. The system according to claim 47 wherein said security token further comprises:

an enrollment biometric template;

means for comparing said entity biometric template to said enrollment biometric template; and means for sending an affirmative signal to said computer system if said entity biometric template matches said enrollment biometric template.

49. The system according to claim 48 wherein said security token further comprises means for allowing said live entity access to at least one secure function following receipt of said affirmative signal.

50. The system according to claim 46 wherein the type of said data transformations is randomly varied after a session.

51. The system according to claim 46 wherein said security token further comprises:

means for dividing said biometric sample into a plurality of sample parts; and means for sequentially transforming said plurality of sample parts.

52. The system according to claim 51 wherein said security token further comprises means for randomly varying said data transformation for each transformed sample part included in said plurality of transformed sample parts.

53. The system according to claim 46, wherein said security token further comprises means for generating a transformed biometric challenge by applying the data transformation to a biometric challenge issued by the security token.

54. The system according to claim 53, wherein at least a portion of extracting said one or more biometric features is specified by said transformed biometric challenge.

55. The system according to claim 46 further comprising:

means for sending said entity biometric template to the security token;

means for comparing said entity biometric template to said enrollment biometric template;

means for sending an affirmative signal to a computer system if said entity biometric template matches said enrollment biometric template; and means for allowing said live entity access to at least one secure function following receipt of said affirmative signal.

\* \* \* \* \*